US007783410B2

(12) United States Patent
Anderson

(10) Patent No.: US 7,783,410 B2
(45) Date of Patent: Aug. 24, 2010

(54) ENGINE PROCESS

(75) Inventor: Curtis O. Anderson, 3604 Catalpa Dr., Colorado Springs, CO (US) 80907

(73) Assignee: Curtis O. Anderson, Colorado Springs, CO (US)

( * ) Notice: Subject to any disclaimer, the term of this patent is extended or adjusted under 35 U.S.C. 154(b) by 365 days.

(21) Appl. No.: 11/779,511

(22) Filed: Jul. 18, 2007

(65) Prior Publication Data

US 2009/0019850 A1 Jan. 22, 2009

(51) Int. Cl.

| | |
|---|---|
| ***F02D 23/00*** | (2006.01) |
| ***F02B 33/00*** | (2006.01) |
| ***B60T 7/12*** | (2006.01) |
| ***G05D 1/00*** | (2006.01) |
| ***F01L 9/04*** | (2006.01) |

(52) U.S. Cl. .......................... 701/103; 60/612; 60/602; 123/90.11; 123/299; 123/316

(58) Field of Classification Search .................. 60/620, 60/612, 602; 123/299, 316, 90.11; 701/103
See application file for complete search history.

(56) References Cited

U.S. PATENT DOCUMENTS 2,189,106 A * 2/1940 Garve et al. .................. 60/612
2,292,233 A * 8/1942 Lysholm .................... 123/316
2,581,668 A * 1/1952 Guercken .................... 60/314
3,397,532 A * 8/1968 Hubers ....................... 60/613
4,159,700 A * 7/1979 McCrum .................. 123/58.8
4,197,711 A * 4/1980 Fuhrmann et al. ............. 60/602
6,779,334 B2 * 8/2004 Teacherson .................. 60/517
7,096,833 B2 * 8/2006 Hitomi et al. ................. 60/620
7,159,560 B2 * 1/2007 Leduc et al. ................ 123/316
7,370,630 B2 * 5/2008 Turner et al. ................ 123/299
2005/0182553 A1 * 8/2005 Miller et al. ................ 701/103
2006/0021606 A1 * 2/2006 Bryant .................... 123/559.1
2007/0062193 A1 * 3/2007 Weber et al. .................. 60/612
2009/0320812 A1 * 12/2009 Lu et al. ..................... 123/657

FOREIGN PATENT DOCUMENTS

FR 2781011 A1 * 1/2000
GB 2402169 A * 12/2004
WO WO 03067066 A1 * 8/2003

* cited by examiner

*Primary Examiner*—Thai Ba Trieu

(57) ABSTRACT

A pressure surface is propelled within an engine chamber. Air is introduced into the chamber. The air in the chamber is compressed with the pressure surface. The compressed air is charged with fuel. The fuel is combusted to propel the pressure surface within the chamber. The air and the combusted fuel are exhausted from the chamber. A turbocharger is powered with the exhaust to compress air to an extremely high level, 20+ atmospheres. The air compressed by the turbocharger is passed into the chamber to propel the pressure surface in the chamber without additional fuel. Since compressing the high pressure air in the chamber would cancel the gains of the previous cycle and possibly damage the engine, this invention proposes to open the exhaust valve at the bottom of the intake stroke to relieve the excess pressure, close the exhaust valve and compress the remaining air in the cylinder.

9 Claims, 8 Drawing Sheets

ENGINE PROCESS

BACKGROUND OF THE INVENTION

In the normal operation of a four cycle internal combustion engine, it is often considered that about one third of the heat energy is dissipated with the radiator, one third goes out the exhaust, and the remaining third is used to do the work.

The two thirds of the heat not engaged in the working of the engine is wasted energy. Capturing this wasted energy and putting it to use in the working of the engine would increase the fuel efficiency of the engine. This invention proposes a method to recover some of the wasted energy by the use of the turbocharger.

A turbocharger uses the exhaust energy to compress air for use in the combusting of fuel. The increased combustion of fuel causes more exhaust energy, which leads to increased combustion, which leads to increased exhaust. This regeneration cycle causes the increased output to spiral out of control which, if not interrupted, will lead to the destruction of the engine and/or turbocharger.

The normal way to control the output of the turbocharger, is to use a waste gate on the exhaust feed to the turbocharger. The waste gate is correctly named as it bypasses (wastes) exhaust energy. This energy therefore is not returned to the engine.

If a method of internal control could be devised, turbocharger could be allowed to operate at full output without regenerating out of control, therefore returning much more of the exhaust energy back into the operation of the engine in the form of greatly increased manifold pressure.

This high pressure (20+) atmosphere, would propel the sliding surface (piston) within the chamber on the intake cycle. This would amount to a power stroke achieved without the expenditure of fuel.

However, when the sliding surface is at the bottom of the intake stroke, attempting to compress the high pressure contents of the chamber would cancel the gains of the high pressure intake cycle, and possibly damage or destroy the engine.

The proposal of this invention is to vent the high pressure contents of the chamber with the use of the exhaust valve—opening the exhaust valve at approximately bottom dead center, venting the pressure, and closing the exhaust valve with a normal cylinder volume—. The cycles to follow, compression, fuel injection, ignition, power, and exhaust would then be done in a normal manner.

DETAILED DESCRIPTION OF THE INVENTION

Figure 1:
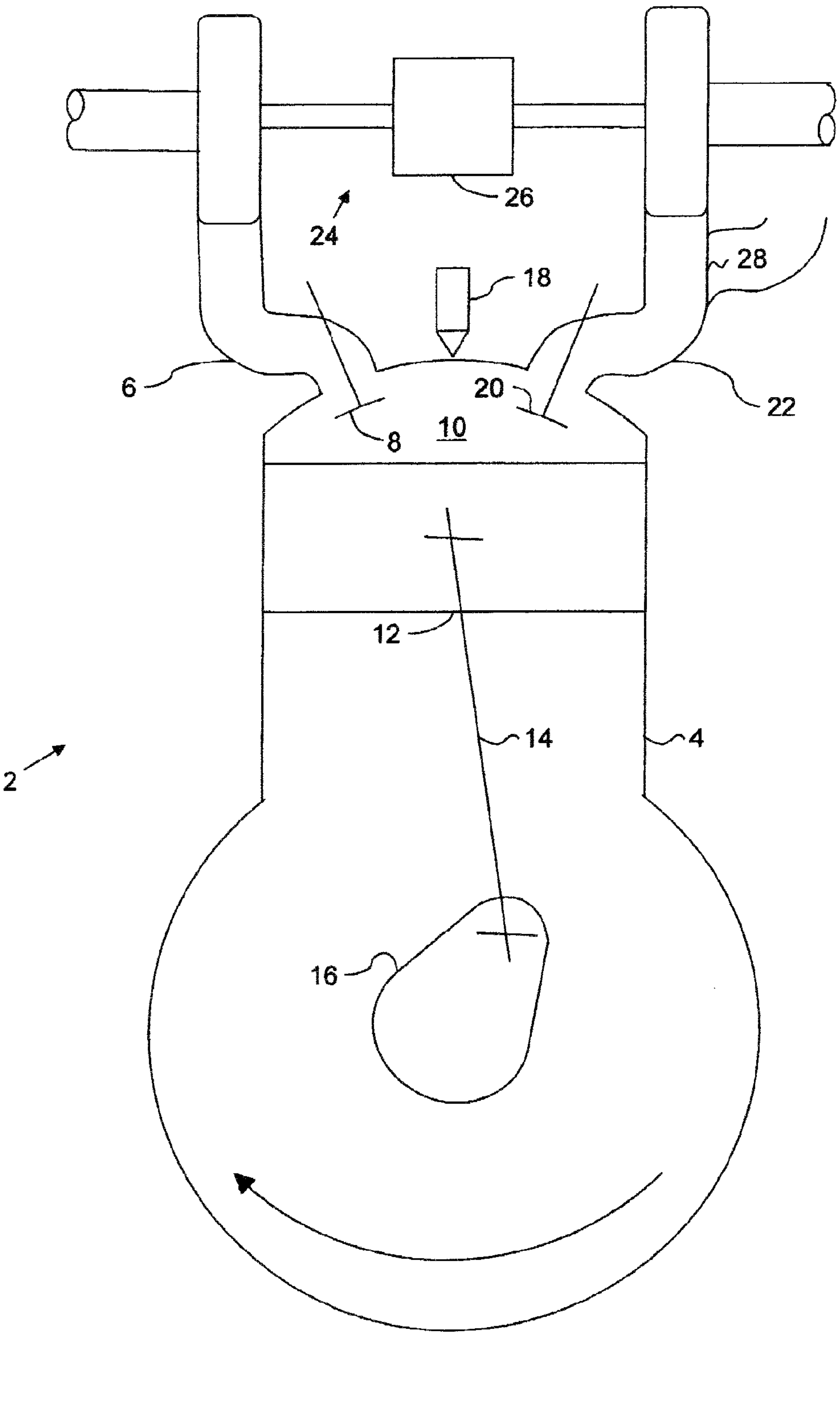
FIG. 1 is schematic view of a cylinder assembly upon which the present invention process operates.

FIG. 1 illustrates a cylinder assembly 2 of an engine upon which the present invention engine process operates. Cylinder assembly 2 includes housing 4, intake port 6, intake valve 8, chamber 10, pressure surface 12, connecting rod 14, crankshaft 16, fuel injector 18, exhaust valve 20, exhaust port 22, turbocharger 24, throttle 26, waste gate 28, and a sensing and controlling systems (not shown).

Chamber 10 is the combustion chamber or engine cylinder where fuel is burned to produce a driving force acting on pressure surface 12. Pressure surface 12 is any pressure surface movable within chamber 10 in response to a driving force, such as fuel combustion.

Fuel injector 18 is any apparatus for introducing fuel into chamber 10. Fuel injector 18 may be, but need not be, a conventional fuel injector.

A piston is one example of a pressure surface 12. Movement of pressure surface 12 within chamber 10 translates through connecting rod 14 to rotate crankshaft 16, producing engine power.

Intake port 6 is the channel through which air, or any other oxygen source for the combustion process, is provided into chamber 10. Intake valve 8 controls the flow of air into chamber 10.

Similarly, exhaust port 22 is the channel through which air and combusted fuel are exhausted from chamber 10. Exhaust valve 20 controls the flow of air and combusted fuel out of chamber 10.

Turbocharger 24 is any apparatus for using exhaust gases to produce compressed air or some other type of compressed gas. While shown as a single device, turbocharger may, alternatively be embodied in multiple device acting in concert to achieve the compression.

Throttle 26 is any device for reducing the output of turbocharger 24. Throttle 26 is useful for controlling the amount of air compressed by turbocharger 24. In a similar vein, waste gate 28 is any type of assembly for redirecting exhaust away from turbocharger 24 to control the output of turbocharger 24.

The sensing system is useful for determining the needs of throttle 26 and waste gate 28. The controlling system is useful for providing the control of throttle 26 and waste gate 28 in response to input from the sensing system.

FIGS. 2-9 illustrate cylinder assembly 2 at various stages of an engine process. Each of FIGS. 2-9 represents a stage in the process. This engine process is cyclical and continuous in nature. Once started, at least some of the steps in the process repeat cyclically during the operation of the engine.

The process of the present invention relates to the operation of pressure surface 12 within chamber 10. Crankshaft 16 and connecting rod 14 are included in the Figures to enhance understanding of the present invention, but are not necessary to the present invention. Additionally, while crankshaft 16 is shown rotating in a clockwise direction, the direction in which crankshaft 16 rotates is immaterial to the present invention.

Figure 2:
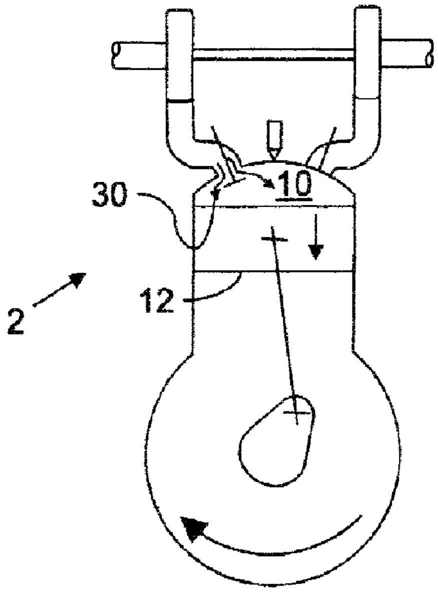
FIGS. 2-9 are schematic views of a cylinder assembly representing various stages of the present invention improved engine process.

FIG. 2 represents one stage in the cycle of the engine process. While shown as the first step, FIG. 2 is not necessarily the first step in the process, since the process is cyclical and may start at any stage.

In FIG. 2, air 30 is introduced into engine chamber 10. While air 30 is entering chamber 10, chamber 10 is enlarged by moving pressure surface 12. Intake valve 8 is open to allow air 30 to enter chamber 10. Exhaust valve 20 is closed to prevent air 30 from being exhausted at this stage.

Figure 3:
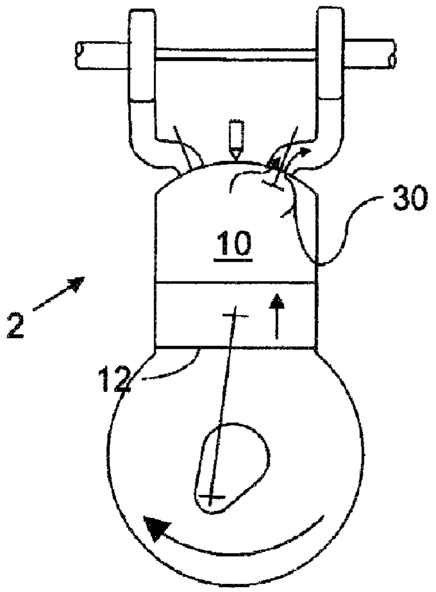

FIG. 3 shows a stage where air 30 in chamber 10 is compressed. During this stage, pressure surface 12 is moved to reduce the size of chamber 10. Intake valve 8 is closed to prevent the escape of air 30 from chamber 10. Exhaust valve 20 is open at approximately the bottom of the dead center, but closes at some point prior to the stage represented in FIG. 4.

Figure 4:
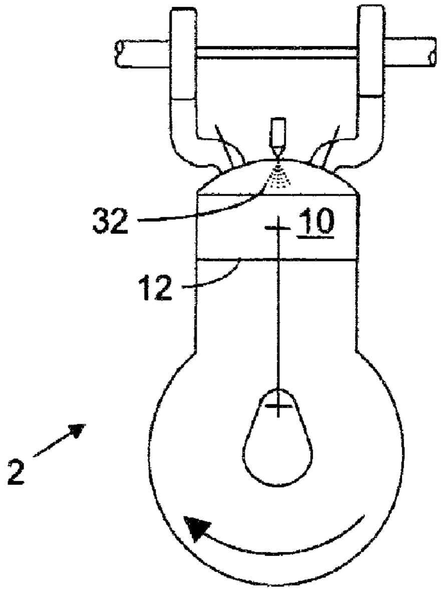

Illustrated in FIG. 4 is the stage of the process whereby fuel 32 is injected into chamber 10. This stage is usually when pressure surface 12 is at or very near a position commonly called top dead center. Both intake valve 8 and exhaust valve 20 are closed to prevent the escape of air 30 from chamber 10.

Figure 5:
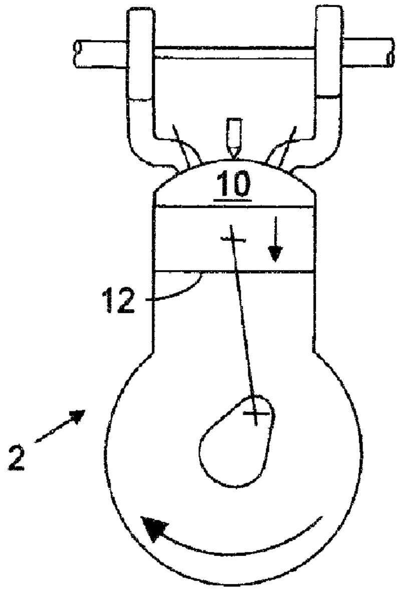

Represented in FIG. 5 is the stage where gas from the combusted fuel 32 drives pressure surface 12 to increase the size of chamber 10. This stage is often referred to as a power stroke since expanding gas from the combustion of fuel 32 creates power which the engine translates into movement. Both intake valve 8 and exhaust valve 20 are closed to prevent the escape of air 30 and combusted fuel 34 from chamber 10.

Figure 6:
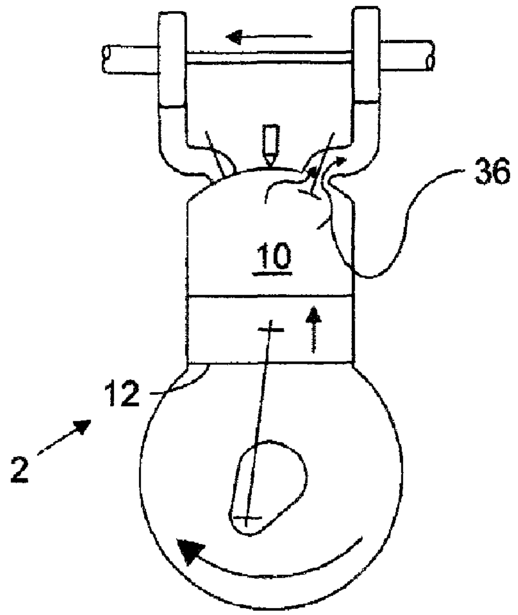

FIG. 6 shows the stage where air 30 and the combusted fuel 34 are exhausted from chamber 10. The exhausted air 30 and combusted fuel 34 are commonly referred to together as exhaust 36. During this stage, exhaust 36 passes through turbocharger 24. In response, turbocharger 24 generates compressed air 38 (FIG. 7) for use in chamber 10. Intake valve 6 is closed to prevent exhaust 36 from entering intake port 6.

Figure 7:
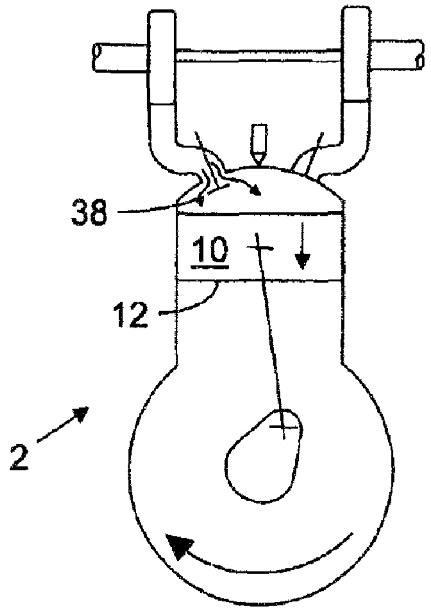

FIG. 7 shows one of the unique features of the present invention. Intake valve 8 is opened to allow compressed air 38 to be directed into chamber 10 to propel pressure surface 12 in chamber 10. As illustrated in this Figure, compressed air 38 drives pressure surface 12 down to produce rotational movement in crankshaft 16. Compressed air 38 drives pressure surface 12 for this entire downward stroke. This movement is a second power stroke since it creates power which the engine translates into movement. As the process cycles, this stage may take the place of the stage shown in FIG. 2. Exhaust valve 20 is closed to prevent compressed air 38 from being vented during this stage.

Figure 8:
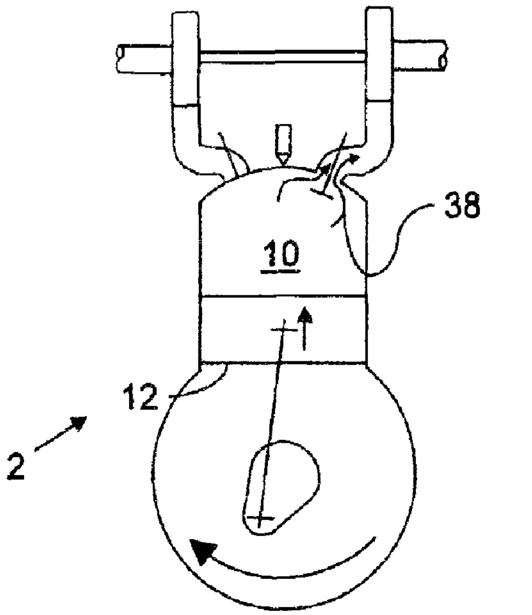

FIG. 8 illustrates the stage where a portion of the compressed air 38 is vented. A portion of the compressed air 38 is vented, by opening exhaust valve 20 at approximately the bottom dead center, in order to allow pressure surface 12 to return and again reduce the size of chamber 10. As it is vented, compressed air decompresses. Intake valve 8 is closed to prevent compressed air 38 from being vented into intake port 6.

Figure 9:
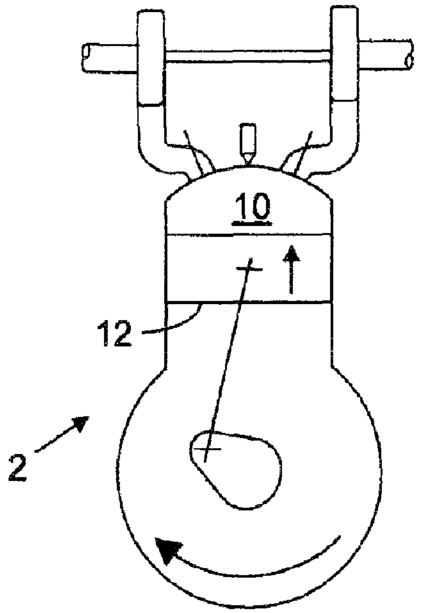
Figure 10:
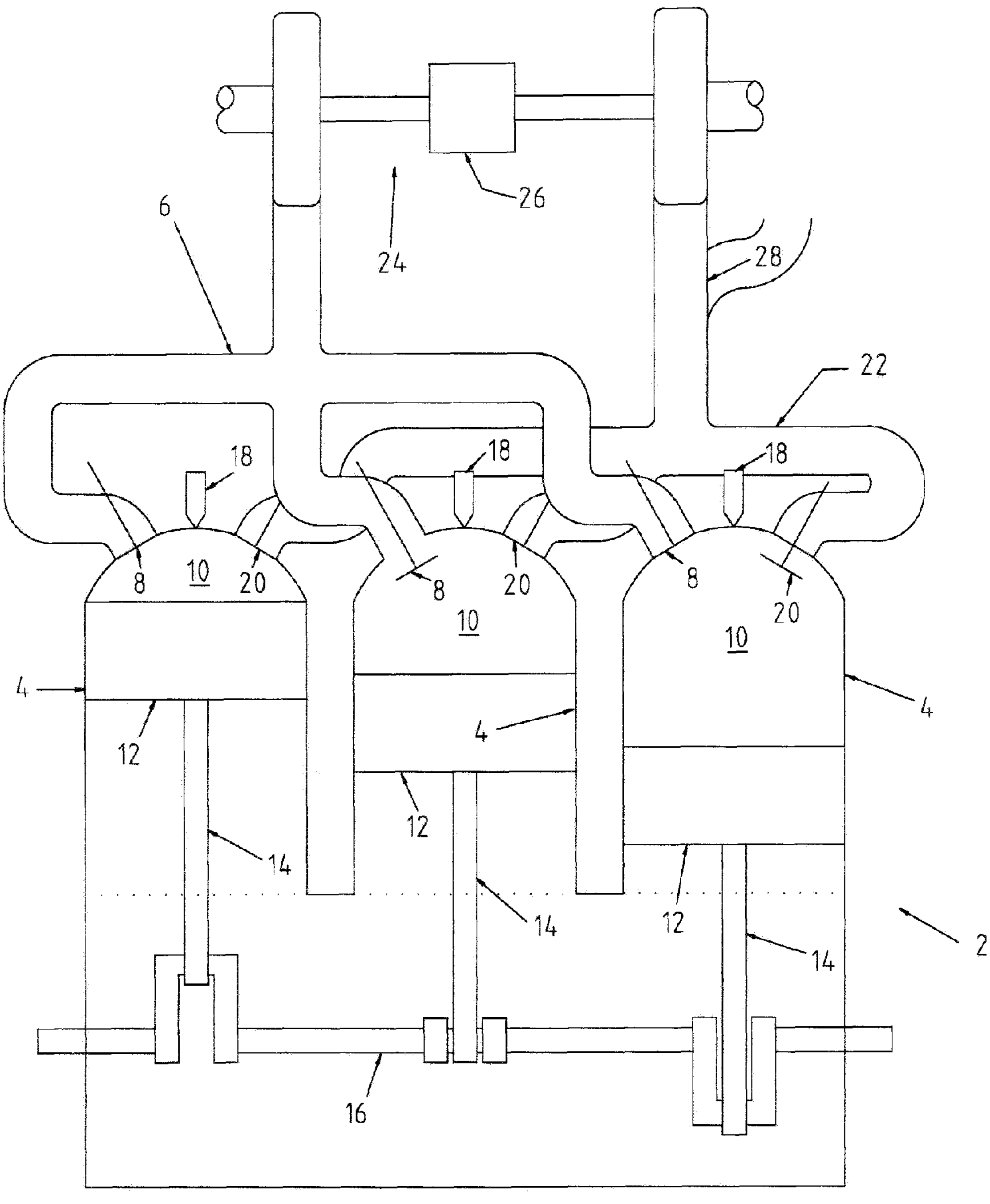
FIG. 10 is schematic view of one possible multiple cylinder assembly upon which the present invention process operates.
Figure 11:
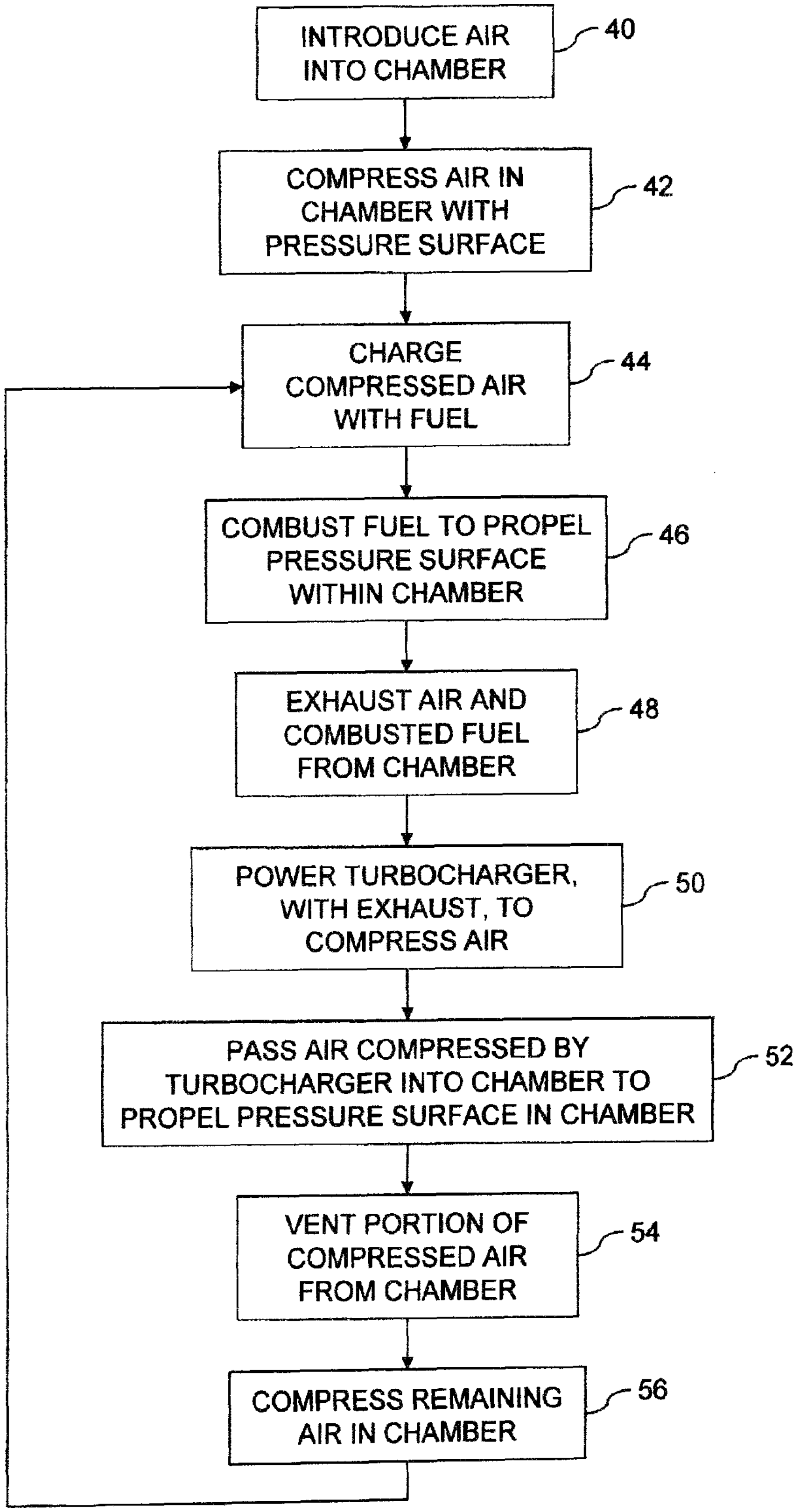
FIG. 11 is a flow chart illustrating a first embodiment of the present invention improved engine process.

In FIG. 9, the exhaust valve 20 is closed in order for the remainder of the compressed air 38 to be recompressed. This recompression is similar to the compression shown in FIG. 3 and may take the place of the compression shown in FIG. 3 as the process cycles. Intake valve 8 and exhaust valve 20 are closed to prevent venting of compressed air 38.

FIGS. 11-14 are flow charts representing steps of embodiments of the present invention. Although the steps represented in FIGS. 11-14 are presented in a specific order, the present invention encompasses variations in the order of steps. Furthermore, additional steps may be executed between the steps illustrated in FIGS. 11-14 without departing from the scope of the present invention.

Air is introduced 40 in a chamber. In one embodiment, the chamber is an engine cylinder.

Air is compressed 42 in the chamber with a pressure surface. In one embodiment, the pressure surface includes a piston.

The compressed air is charged 44 with fuel. The fuel is combusted 46 to propel the pressure surface within the chamber. The air and the combusted fuel are exhausted 48 from the chamber. A turbocharger is powered 50 with the exhaust, to compress air. The compressed air is passed 52 into the chamber to propel the pressure surface in the chamber. A portion of the compressed air is vented 54 at approximately at the bottom of the dead center from the chamber. The remaining air in the chamber is compressed 56. The cycle then repeats by returning to step 44 to charge the air in the chamber with fuel.

Figure 12:
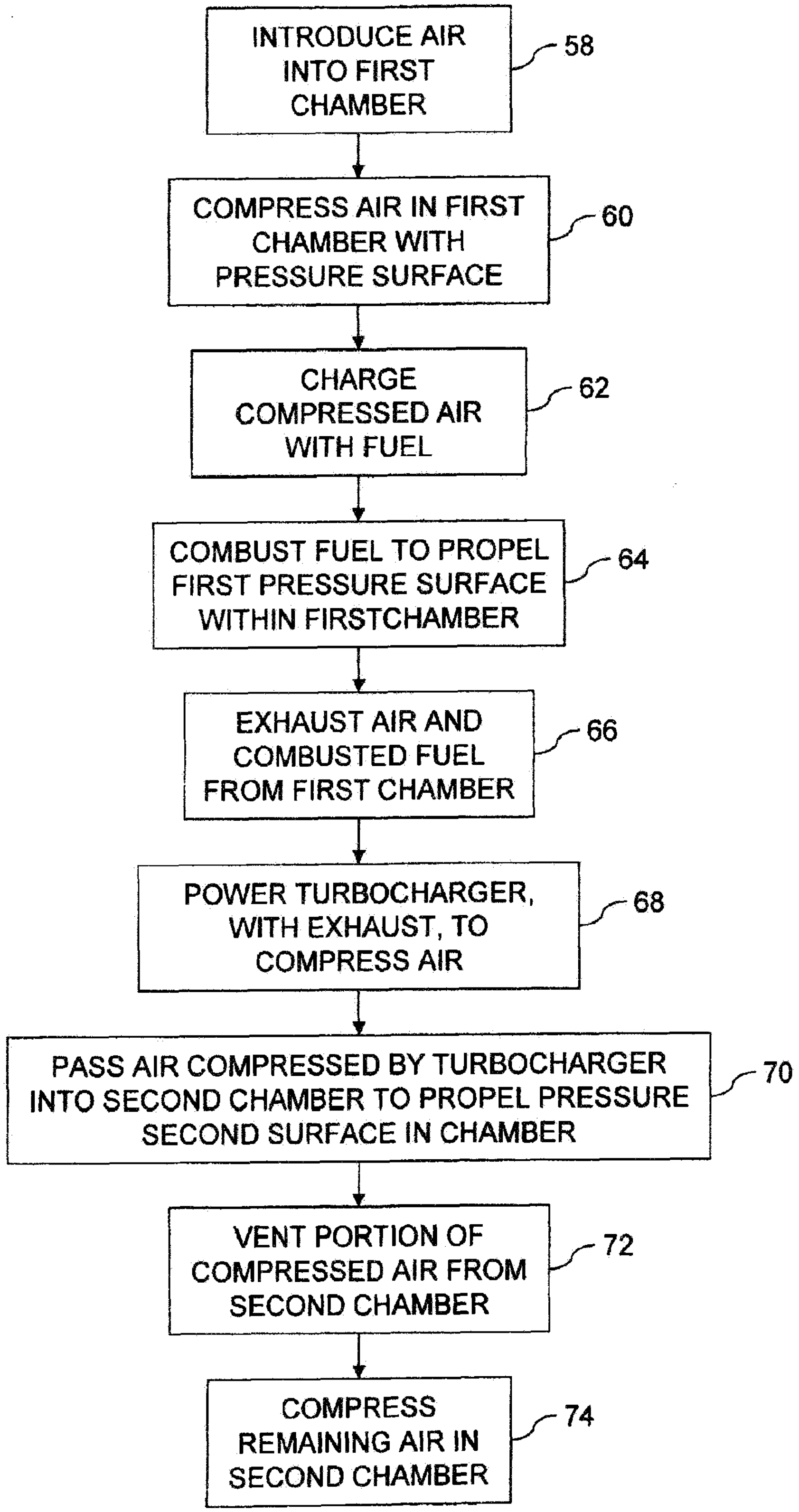
FIG. 12 is a flow chart illustrating a second embodiment of the present invention improved engine process.
Figure 13:
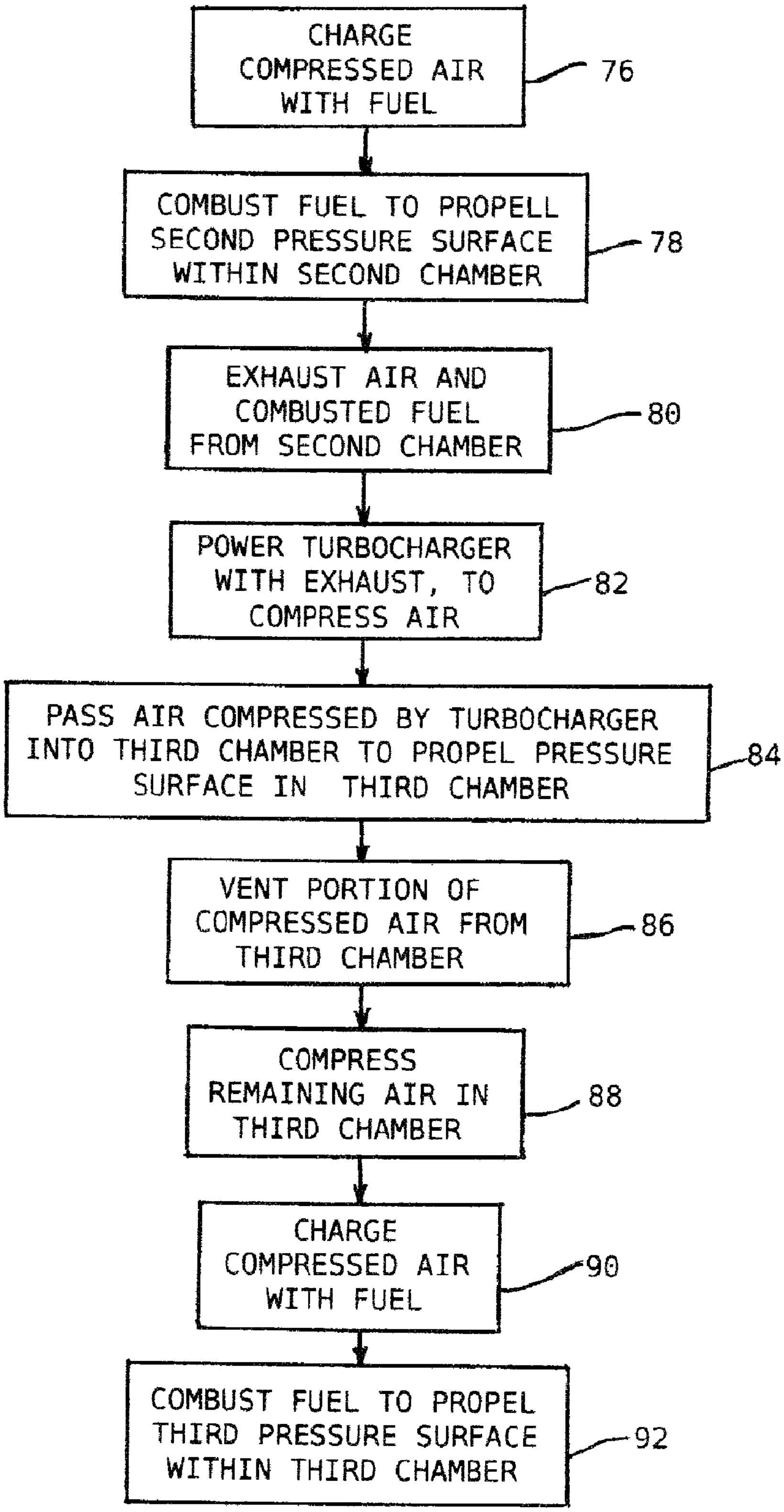
FIG. 13 is a flow chart illustrating one embodiment of alternative subsequent steps to the embodiment of the present invention improved engine process illustrated in FIG. 11.
Figure 14:
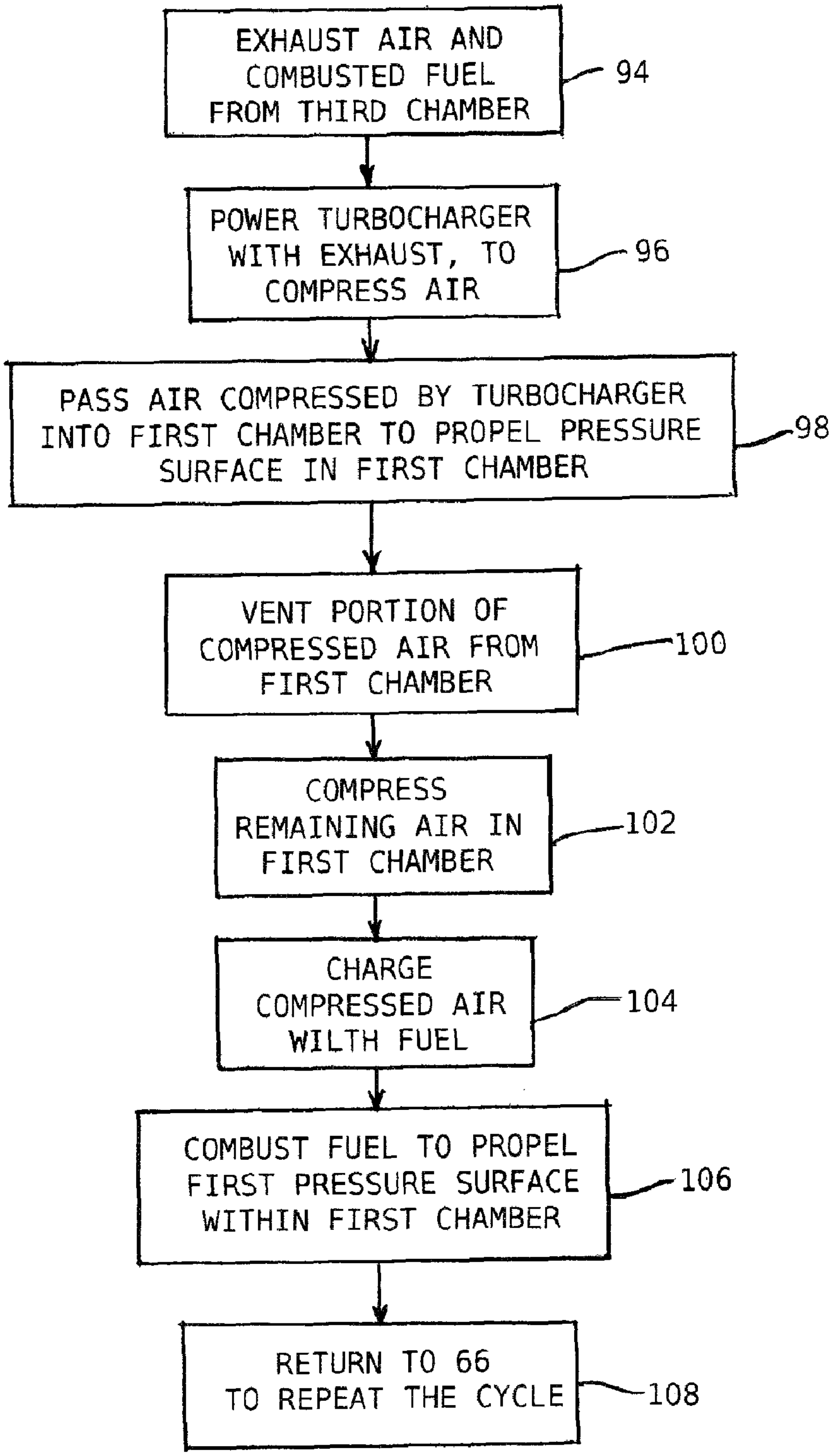
FIG. 14 is a flow chart illustrating another embodiment of alternative subsequent steps to the embodiment of the present invention improved engine process illustrated in FIG. 11.

FIG. 12 represents an alternate embodiment of the present invention engine process, wherein a plurality of pressure surfaces is driven within a plurality of engine chambers.

Air is introduced 58 into a first one of chambers. Air is compressed 60 in the first chamber with a first one of pressure surfaces. The compressed air is charged 62 with fuel. The fuel is combusted 64 to propel the first pressure surface within the first chamber. The air and the combusted fuel are exhausted 66 from the first chamber.

A turbocharger is powered 68, with the exhaust to compress air. The compressed air is passed 70 into a second one of chambers to propel a second one of pressure surfaces in the second chamber. A portion of the compressed air is vented 72 at approximately at the bottom of the dead center from the second chamber. The remaining air is compressed 74 in the second chamber.

The compressed air is charged 76 with fuel. The fuel is combusted 78 to propel the second pressure surface within the second chamber. The air and the combusted fuel are exhausted 80 from the second chamber. A turbocharger is powered 82, with the exhaust to compress air.

The compressed air is passed 84 into a third one of chambers to propel a third one of pressure surfaces in the third chamber. A portion of the compressed air is vented 86 at approximately at the bottom of the dead center from the third chamber. The remaining air is compressed 88 in the third chamber with a third one of the pressure surfaces. The compressed air is charged 90 with fuel. The fuel is combusted 92 to propel the third pressure surface within the third chamber.

The air and the combusted fuel are exhausted 94 from the third chamber. A turbocharger is powered 96 with the exhaust, to compress air. The compressed air is passed 98 into the first one of the chambers to propel the first pressure surface in the first chamber. A portion of the compressed air is vented 100 at approximately at the bottom of the dead center from the first chamber.

The remaining air is compressed 102 in the first chamber with a first one of the pressure surfaces. The compressed air is charged 104 with fuel. The fuel is combusted 106 to propel the first pressure surface within the first chamber. The cycle then repeats 108 by returning to step 66 to form a cycle.

The foregoing description is only illustrative of the invention. Various alternatives, modifications, and variances can be devised by those skilled in the art without departing from the invention. Accordingly, the present invention embraces all such alternatives, modifications, and variances that fall within the scope of the described invention

What is claimed is:

1. A method for driving a pressure surface within an engine chamber, the method comprising the steps of:

introducing air into the chamber;

compressing the air in the chamber with the pressure surface;

charging the compressed air with fuel;

combusting the fuel to propel the pressure surface within the chamber;

exhausting the air and the combusted fuel from the chamber;

powering a turbocharger, with the exhaust, to compress air;

passing the air compressed by the turbocharger into the chamber to propel the pressure surface in the chamber; and opening an exhaust valve to vent a portion of the compressed air from the chamber after the pressure surface is propelled with the air compressed by the turbocharger at approximately bottom dead center of the chamber.

2. The method of claim 1 further including after venting a portion of the compressed air from the chamber at approximately the bottom dead center, compressing the remaining air in the chamber.

3. The method of claim 1 wherein the chamber includes an engine cylinder and the pressure surface includes a piston.

4. The method of claim 1 wherein passing the air compressed by the turbocharger into the chamber to propel the pressure surface in the chamber includes passing the air compressed by the turbocharger into the chamber to propel, without charging the compressed air with fuel and combusting fuel, the pressure surface in the chamber.

5. A method for propelling pistons within engine cylinders, the method comprising the steps of:

introducing air into a first cylinder;

compressing the air in the first cylinder with a first piston;

charging the compressed air with fuel;

combusting the fuel to propel the first piston within the first cylinder;

exhausting the air and the combusted fuel from the first cylinder;

powering a turbocharger, with the exhaust, to compress air;

passing the air compressed by the turbocharger into a second cylinder to propel a second piston in the second cylinder; and opening an exhaust valve to vent a portion of the compressed air from the second cylinder after the second piston is propelled with the air compressed by the turbocharger at approximately bottom dead center of the second cylinder.

6. The method of claim 5, further including the step of passing the air compressed by the turbocharger into the second cylinder to propel the second piston in the second cylinder includes passing the air compressed by the turbocharger into the second cylinder to propel, without charging the compressed air with fuel and combusting fuel, the second piston in the second cylinder.

7. The method of claim 5 further including the step of passing the air compressed by the turbocharger into the cylinder to propel the piston in the cylinder includes passing the air compressed by the turbocharger into the cylinder to propel, without charging the compressed air with fuel and combusting fuel, the piston in the cylinder.

8. A method for driving a plurality of pressure surfaces within a plurality of engine chambers plurality of engine chambers, the method comprising the steps of:

introducing air into a first one of the chambers;

opening an exhaust valve to vent the chamber at approximately bottom dead center of the chamber;

compressing the remaining air in the first chamber with a first one of the pressure surfaces;

charging the compressed air with fuel;

combusting the fuel to propel the first pressure surface within the first chamber;

exhausting the air and the combusted fuel from the first chamber;

powering a turbocharger, with the exhaust, to compress air;

passing the air compressed by the turbocharger into a second one of the chambers to propel a second one of the pressure surfaces in the second chamber; and opening the exhaust valve to vent a portion of the compressed air from the second chamber after the second pressure surface is propelled with the air compressed by the turbocharger at approximately bottom dead center of the second chamber;

compressing the remaining air in the second chamber with a second one of the pressure surfaces;

charging the compressed air with fuel;

combusting the fuel to propel the second pressure surface within the second chamber;

exhausting the air and combusted fuel from the second chamber;

powering a turbocharger, with the exhaust, to compress air;

passing the air compressed by the turbocharger into a third one of the chambers to propel a third one of the pressure surfaces in the third chamber; and opening the exhaust valve to vent a portion of the compressed air from the third chamber after the third pressure surface is propelled with the air compressed by the turbocharger at approximately bottom dead center of the third chamber;

compressing the remaining air in the third chamber with a third one of the pressure surfaces;

charging the compressed air with fuel;

combusting the fuel to propel the third pressure surface within the third chamber; exhausting the air and combusted fuel from the third chamber;

powering a turbocharger, with the exhaust, to compress air; and passing the air compressed by the turbocharger to a first one of the chambers to continue an operating engine cycle.

9. The method of claim 8 wherein the chambers include engine cylinders and the pressure surfaces include pistons.

* * * * *